United States Patent [19]

Fukunaga et al.

[11] Patent Number: 4,848,790

[45] Date of Patent: Jul. 18, 1989

[54] HYDRAULIC PRESSURE SUPPLY SYSTEM VARIABLE OF PRESSURE SUPPLY RATE DEPENDING UPON DRIVING CONDITION OF AUTOMOTIVE VEHICLE

[75] Inventors: Yukio Fukunaga; Yoshiki Tsuda; Naoto Fukushima; Yohsuke Akatsu; Sunao Hano; Masaharu Sato, all of Kanagawa, Japan

[73] Assignee: Nissan Motor Company, Limited, Yokohama, Japan

[21] Appl. No.: 178,066

[22] Filed: Apr. 5, 1988

[30] Foreign Application Priority Data

Apr. 6, 1987 [JP] Japan .................................. 62-84387

[51] Int. Cl.⁴ ............................................. B60G 11/26
[52] U.S. Cl. .................................... 280/707; 280/714; 417/3
[58] Field of Search ................ 280/707, 714; 364/424; 417/2, 3, 4, 5

[56] References Cited

U.S. PATENT DOCUMENTS

| | | | |
|---|---|---|---|
| 4,624,476 | 11/1986 | Tanaka et al. | 280/707 |
| 4,695,074 | 9/1987 | Kobayashi et al. | 280/707 |
| 4,702,490 | 10/1987 | Yamaguchi et al. | 280/707 |

FOREIGN PATENT DOCUMENTS 0193124  9/1986  European Pat. Off. .

Primary Examiner—David M. Mitchell
Assistant Examiner—Ross Weaver
Attorney, Agent, or Firm—Foley & Lardner, Schwartz, Jeffery, Schwaab, Mack, Blumenthal & Evans

[57] ABSTRACT

A hydraulic pressure supply system includes a discharge rate variable fluid pump. The discharge rate of the fluid pump is controlled to vary depending upon the vehicle driving condition. In the control of the discharge rate of the fluid pump, greater discharge rate is ordered while the vehicle is running, than that during vehicle stopping condition.

35 Claims, 14 Drawing Sheets

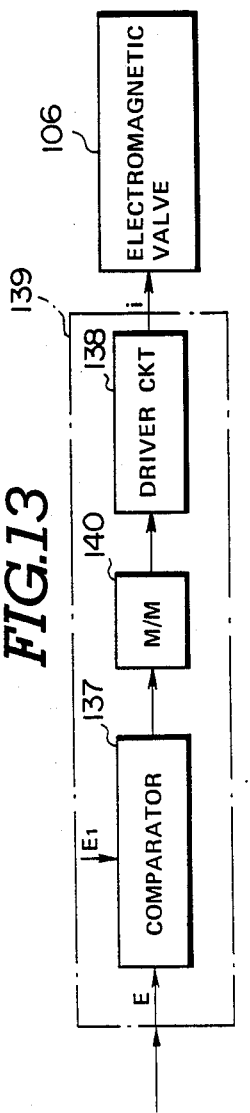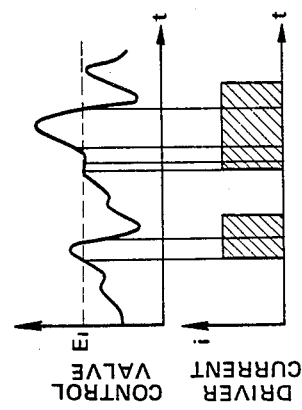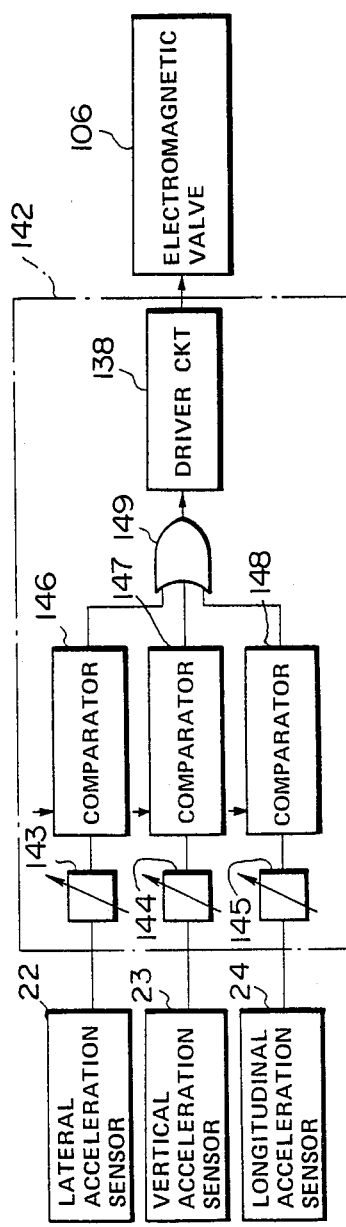

HYDRAULIC PRESSURE SUPPLY SYSTEM VARIABLE OF PRESSURE SUPPLY RATE DEPENDING UPON DRIVING CONDITION OF AUTOMOTIVE VEHICLE

BACKGROUND OF THE INVENTION

1. Field of the Invention

The present invention relates generally to an automotive hydraulic system for supplying a pressurized working fluid to a hydraulically operable automotive device, such as an automotive hydraulic suspension system. More specifically, the invention relates to a hydraulic pressure supply control system which is variable of pressure supply characteristics depending upon the vehicle driving condition. The present invention also relates to an actively controlled automotive suspension system employing a hydraulic pressure supply system for varying suspension characteristics according to the vehicle driving condition.

2. Description of the Background Art

In general, the conventional automotive hydraulic system includes an engine driven fluid pump as a fluid pressure source for supplying a pressurized working fluid to automotive devices, such as a hydraulic actuator, a hydraulic suspension damper and so forth. The engine driven fluid pump is generally driven by an output torque of the engine. The hydraulic system also includes a pressure relief valve for maintaining the working pressure in a pressure line below a predetermined pressure level.

In such engine driven fluid pump, the pump speed is naturally variable depending upon the engine revolution speed. This differentiates fluid pressure supply efficiency. In the hydraulically operable automotive devices, such as hydraulic suspension system, such variation of the fluid pressure in the hydraulic system will influence to performance or response characteristics of the automotive hydraulic devices. In order to maintain desired minimum performance of the automotive hydraulic device, the discharge ratio of the working fluid at the engine minimum revolution speed can be set at the rated flow. By this extra amount of working fluid to be relieved through a return line of the hydraulic system increases as increasing the engine revolution speed.

Here, assuming that the set relief pressure of the pressure relief valve is Pr, the pump speed which corresponds to the engine speed is N, the discharge amount of the fluid pump per revolution is Q, power P to be consumed by the fluid pump can illustrated by:

$$P = (Pr + a) \times N \times Q$$

where a is a constant. As will be seen herefrom, the consumed power P is proportional to the pump speed and thus increases according to increase of the engine speed. The consumed power P by the fluid pump serves as power lose of the engine to cause drop of fuel economy.

Furthermore, in the conventional system, since the conventional fluid pump maintains predetermined pump speed for maintaining the rated flow even in low engine speed condition, such as the engine idling condition while the vehicle is stopping. In case that the automotive hydraulic device is a hydraulic suspension system, such as an actively controlled suspension system, all of the pressure control valve is shut to maintain the fluid pressure constant so as not to cause height variation. This clearly wastes the engine output power.

Furthermore, even when the vehicle is running, the required fluid pressure may be variable depending upon the vehicle driving condition. Namely, when the vehicle is running in steady or stable condition in straight, required fluid pressure in the actively controlled suspension system will be substantially small since no substantial attitude change will occur. On the other hand, when the vehicle travels through a corner to cause vehicular rolling, higher fluid pressure has to be required for obtaining quick response to attitude change for quickly regulate the vehicular attitude. In order to satisfy the requirement for the higher fluid pressure at unstable vehicle driving condition, the fluid pressure during vehicle running condition has to be set at a level which is unnecessary for steady or stable state vehicle driving. This also serves to cause power lose and whereby to cause degradation of the fuel economy.

Furthermore, the power lose during the vehicle running condition may cause lowering of the vehicle acceleration characteristics and performance and degradation of the drivability.

SUMMARY OF THE INVENTION

Therefore, it is a principle object of the present invention to provide a hydraulic pressure supply system which saves energy lose and whereby reduces a load on the engine.

Another object of the invention is to provide a hydraulic pressure supply system which is variable of pressure supply rate depending upon the vehicle driving condition and whereby minimize power lose.

In order to accomplish the aforementioned and other objects, a hydraulic pressure supply system, according to the present invention, includes a discharge rate variable fluid pump. The discharge rate of the fluid pump is controlled to vary depending upon the vehicle driving condition.

In the practical control of the discharge rate of the fluid pump, greater discharge rate is ordered while the vehicle is running, than that during vehicle stopping condition.

According to one aspect of the invention, a hydraulic suspension system for an automotive vehicle comprises a hydraulic cylinder disposed between a vehicle body and a suspension member rotatably supporting a vehicular wheel, the hydraulic cylinder defining a pressure chamber filled with a working fluid and connected to a hydraulic circuit for varying fluid pressure in the pressure chamber for generating a variable damping force against relative displacement between the vehicle body and the suspension member for regulating the vehicular attitude, a working fluid pressure source which includes a pressurized fluid source means for generating fluid pressure therein, the pressurized fluid source means being associated with an automotive engine to be driven by the output torque of the engine, which working fluid pressure source is variable of the working fluid discharge rate at least between a first greater rate and a second smaller rate, a detector means for monitoring a preselected control parameter which representative of the load condition in suspension control for regulating the vehicular attitude to produce a detector signal having a value variable at least between a first value representative of high control load condition and a second value representative of low control load condition, and control means, associated with the working fluid pressure source and responsive to the detector signal for varying working fluid discharge rate between the first and second rate, the control means operating the working fluid pressure source for supplying pressurized fluid at the first rate in response to the first value of the detector signal.

According to another aspect of the invention, an actively controlled automotive suspension system for an automotive vehicle comprises a hydraulic cylinder disposed between a vehicle body and a suspension member rotatably supporting a vehicular wheel, the hydraulic cylinder defining a pressure chamber filled with a working fluid and connected to a hydraulic circuit for varying fluid pressure in the pressure chamber for generating a variable damping force against relative displacement between the vehicle body and the suspension member for regulating the vehicular attitude, a working fluid pressure source which includes a pressurized fluid source means for generating fluid pressure therein, the pressurized fluid source means being associated with an automotive engine to be driven by the output torque of the engine, which working fluid pressure source is variable of the working fluid discharge rate at least between a first greater rate and a second smaller rate, a sensor for monitoring vehicular attitude for producing a sensor signal having a value indicative of magnitude of attitude change of the vehicle body, an attitude controller means for deriving a control signal based on the sensor signal for varying fluid pressure in the pressure chamber and whereby regulating the vehicular attitude, a detector means for monitoring a preselected control parameter which representative of the load condition in suspension control for regulating the vehicular attitude to produce a detector signal having a value variable at least between a first value representative of high control load condition and a second value representative of low control load condition, and control means, associated with the working fluid pressure source and responsive to the detector signal for varying working fluid discharge rate between the first and second rate, the control means operating the working fluid pressure source for supplying pressurized fluid at the first rate in response to the first value of the detector signal.

The attitude control means includes a pressure control valve disposed within the hydraulic circuit for controlling supply and drain of working fluid pressure in the pressure chamber, the pressure control valve being variable of the valve position at least between pressure supply position and pressure drain position depending upon a value of control signal derived on the basis of the sensor signal value.

In the practical construction, the working fluid source comprises a first and second fluid pumps drivingly connected to the automotive engine to be driven by the output torque thereof, the first fluid pump being directly connected to a pressure supply line connecting said working fluid source to the hydraulic circuit and the second fluid pump being connected to the hydraulic circuit via a pressure supply control valve serving as the control means for selectively establishing and blocking fluid communication between the second fluid pump and the hydraulic circuit, the pressure supply control valve being responsive to the first value of the detector signal for establishing fluid communication between the second fluid pump and the hydraulic circuit.

On the other hand, the detector means may detect vehicle speed lower than a predetermined speed to produce the second value of detector signal and to produce the first value of detector signal otherwise. The detector means detects the vehicle substantially at stopping condition to produce the second value of detector signal. In the alternative, the detector means detects the control signal ordering increase of the fluid pressure in the pressure chamber to produce the first value of detector signal and to produce the second value of detector signal otherwise.

According to a further aspect of the invention, a hydraulic pressure supply system for a hydraulically operated vehicular device comprising: suspension system for an automotive vehicle comprises a working fluid pressure source which includes a pressurized fluid source means for generating fluid pressure therein, the pressurized fluid source means being associated with an automotive engine to be driven by the output torque of the engine, which working fluid pressure source is variable of the working fluid discharge rate at least between a first greater rate and a second smaller rate, a detector means for monitoring a preselected control parameter which representative of the load condition in the hydraulically operated vehicular device for producing a detect signal having a value variable at least between a first value representative of high load condition and a second value representative of low load condition, and control means, associated with the working fluid pressure source and responsive to the detector signal for varying working fluid discharge rate between the first and second rate, the control means operating the working fluid pressure source for supplying pressurized fluid at the first rate in response to the first value of the detector signal.

According to a still further aspect of the invention, a hydraulic pressure supply system for a hydraulically operated vehicular device comprising: suspension system for an automotive vehicle comprises a working fluid pressure source which includes a pressurized fluid pump means for generating fluid pressure therein, the pressurized fluid pump means being drivingly associated with an automotive engine to be driven by the output torque of the engine for varying working fluid discharge rate depending upon the engine revolution speed, which working fluid pressure source is further variable of the working fluid supply rate at least between a first greater rate and a second smaller rate, a detector means for monitoring a preselected control parameter which representative of the load condition in the hydraulically operated vehicular device for producing a detect signal having a value variable at least between a first value representative of high load condition and a second value representative of low load condition, and control means, associated with the working fluid pressure source and responsive to the detector signal for varying working fluid supply rate between the first and second rate, the control means operating the working fluid pressure source for supplying pressurized fluid at the first rate in response to the first value of the detector signal.

BRIEF DESCRIPTION OF THE DRAWINGS

In the drawings:

FIG. 13 is a schematic block diagram of another embodiment of the control unit in the actively controlled suspension system of FIG. 9;

FIG. 14 is a timing chart showing operation of the control unit of FIG. 13;

FIG. 15 is a schematic block diagram of a further embodiment of the control unit in the actively controlled suspension system of FIG. 9;

DESCRIPTION OF THE PREFERRED EMBODIMENT

Figure 1:
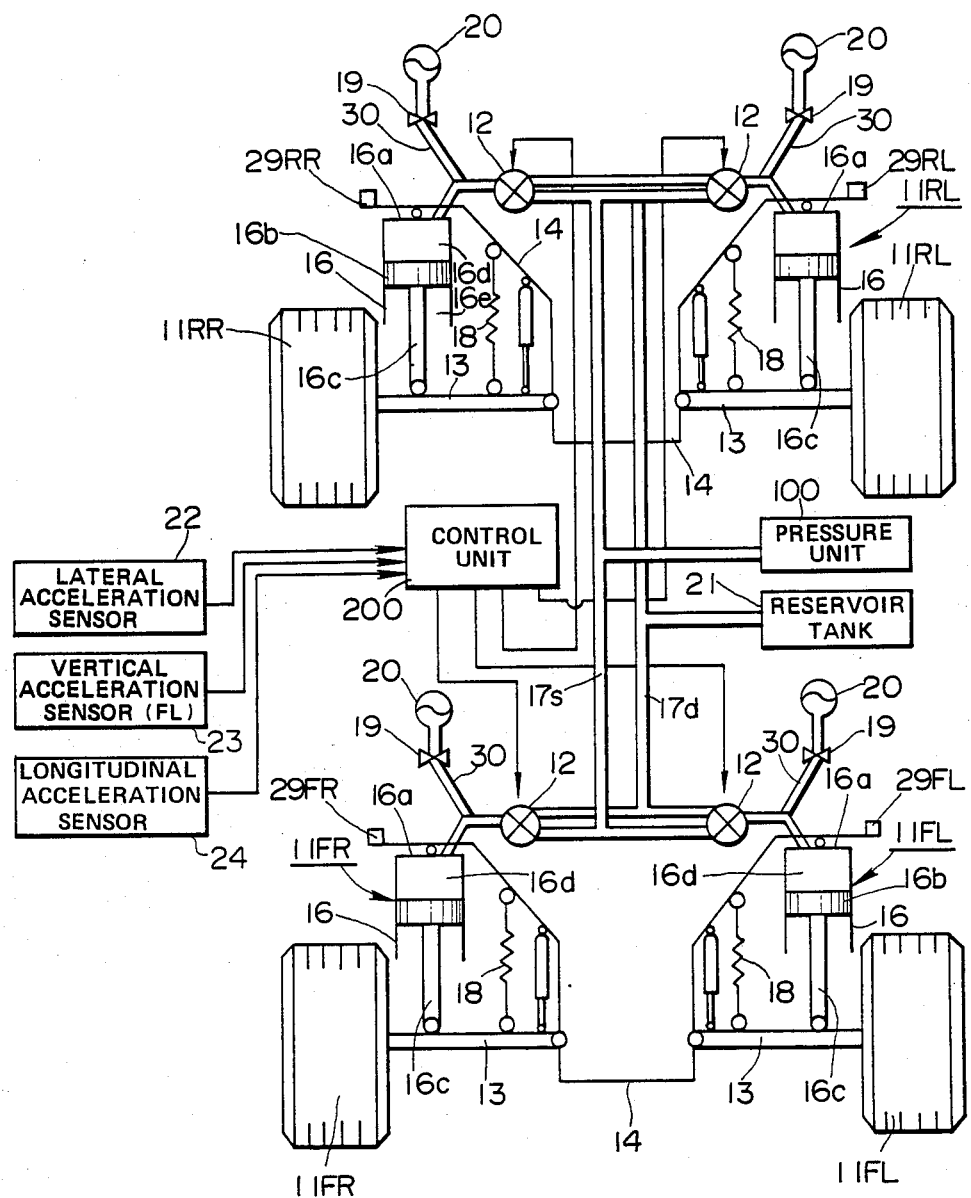
FIG. 1 is a diagram of an actively controlled automotive suspension system to which the preferred embodiment of a hydraulic pressure supply system according to the present invention.

In order to facilitate better understanding of the preferred embodiment of a hydraulic pressure supply system, according to the invention, one of the example of actively controlled suspension systems will be discussed in advance of discussion of the preferred embodiments of the hydraulic systems. Referring now to the drawing, particularly to FIG. 1, a vehicle has four suspension systems for respectively suspending vehicle body 14 on front-left, front-right, rear-left and rear-right road wheels 11FL, 11FR, 11RL and 11RR. Each of the front-left, front-right, rear-left and rear-right suspension systems comprises a suspension member 13, such as a suspension link, a suspension arm and so forth, and a suspension assembly which is interposed between the vehicle body 14 and the suspension member 13. The suspension assembly has a hydraulic cylinder 16 which serves as an actuator for generating damping force against bounding and rebounding motion between the vehicle body and the suspension member, and a coil spring 18.

It should be appreciated that, in the shown embodiment, the coil spring 18 is not necessary to damp dynamic kinematic energy and should resiliently support only static load to be exerted between the vehicle body and the suspension member. However, it should be, of course, possible to employ the coil spring which can be strong enough to damp part of dynamic kinematic energy in relative bounding and rebounding motion of the vehicle body and the suspension member.

The hydraulic cylinder 16 has a hollow cylinder housing 16a filled with a viscous working fluid and a piston 16b sealingly and thrustingly disposed within the internal space of the cylinder housing to divide the cylinder space into upper and lower fluid chambers 16d and 16e. A piston rod 16c extends through one end of the cylinder housing 16a. The other end of the cylinder housing 16a is connected to one of the vehicle body 14 and the suspension member 13. On the other hand, the end of the piston rod 16c is connected to the other of the vehicle body 14 and the suspension member 13.

In the practical construction of the shown embodiment of the actively controlled suspension system, the piston rod 16c extends downwardly through the cylinder housing 16a to be connected to the suspension member 13 at the lower end thereof. Therefore, the top end of the cylinder housing 16a is connected to the vehicle body 14.

The hydraulic cylinder 16 of the suspension assembly is connected to a hydraulic pressure source unit 100 via a hydraulic circuit which includes pressure control valve 12. The pressure control valve 12 is electrically operable and connected to a microprocessor-based control unit 200. The hydraulic circuit 17 includes a supply line 17s and a drain line 17d. The pressure source unit 100 generally comprises a pressure unit 103 and a reservoir tank 109. The pressure unit 103 is connected to the reservoir tank 109 to suck the viscous working fluid in the reservoir tank 109 to feed to the pressure control valve 12 via the supply line 17s. On the other hand, the drain line 17d is connected to the reservoir 109 to return the working fluid thereto.

As seen from FIG. 1, a pressure accumulators 20 are communicated with the upper fluid chamber 16d of the hydraulic cylinder 16 via a pressure line 30. A throttle valve 19 is inserted between the upper fluid chamber 16d and the pressure accumulator 30. In the shown embodiment, the throttle valve 19 has a fixed throttling rate.

Figure 2:
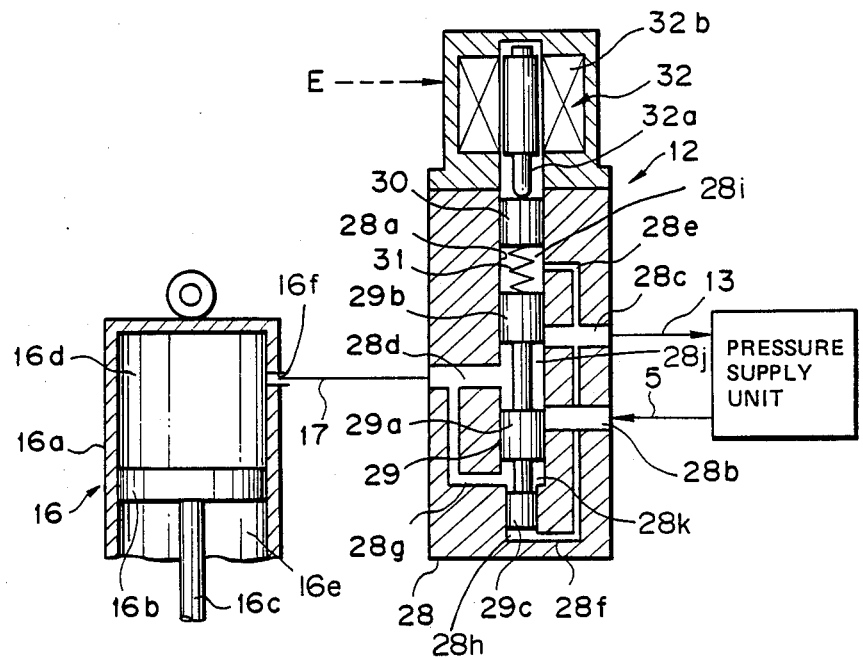
FIG. 2 is an enlarged section showing the detail of a pressure control valve employed in the actively controlled automotive suspension system.

FIG. 2 shows the detailed construction of the hydraulic cylinder 16 and the pressure control valve 12. As will be seen from FIG. 2, the hollow cylinder housing 16a is formed with a port 16f communicating the upper fluid chamber 16d to an outlet port 28d of the pressure control valve 12 via a communication line 17. Though FIG. 2 does not show clear construction, the lower fluid chamber 16e is defined as an enclosed space and is filled with the viscous working fluid. The pressure of the working fluid in the lower fluid chamber 16e at an initial position of the piston 16c serves as a reference pressure and per se serves as resistance for downward movement of the piston.

The pressure control valve 12 has a valve housing 28 having the aforementioned outlet port 28d, an inlet port 28b and a drain port 28c. Respective inlet port 28b, the drain port 28c and the outlet port 28d are connected to a valve bore 28a defined within the valve housing 28. A valve spool 29 is disposed within the valve bore 28a for thrusting movement therein. The valve spool 29 has first, second and third lands 29a, 29b and 29c. As will be seen from FIG. 2, the third land 29c has smaller diameter than that of the first and second lands 29a and 29b. The third land 29c defines a fifth pressure control chamber 28h which is connected to the drain port 28c via a drain path 28f. An actuator piston 30 is also disposed within the valve bore 28a. The actuator piston 30 opposes the second land 29b in spaced apart relationship to define a second pressure control chamber 28i which is connected to the drain port 28c via a drain path 28e. An annular pressure chamber 28j is defined between the first and second lands 29a and 29b. The pressure chamber 28j is constantly communicated with the outlet port 28d and whereby communicated with the upper fluid chamber 16d. On the other hand, the pressure chamber 28j shifts according to shifting of the valve spool 29 to selectively communicate with the inlet port 28b and the drain port 28c. On the other hand, an pressure control chamber 28k is defined between the first and third lands 29a and 29c. The pressure control chamber 28k is in communication with the outlet port 28d via a pilot path 28g. A bias spring 31 is interposed between the actuator piston 30 and the valve spool 29. The actuator piston 30 contacts with an actuator rod 32a of an electrically operable actuator 32 which comprises an electromagnetic solenoid. The solenoid 32 comprises a proportioning solenoid.

Figure 3A:
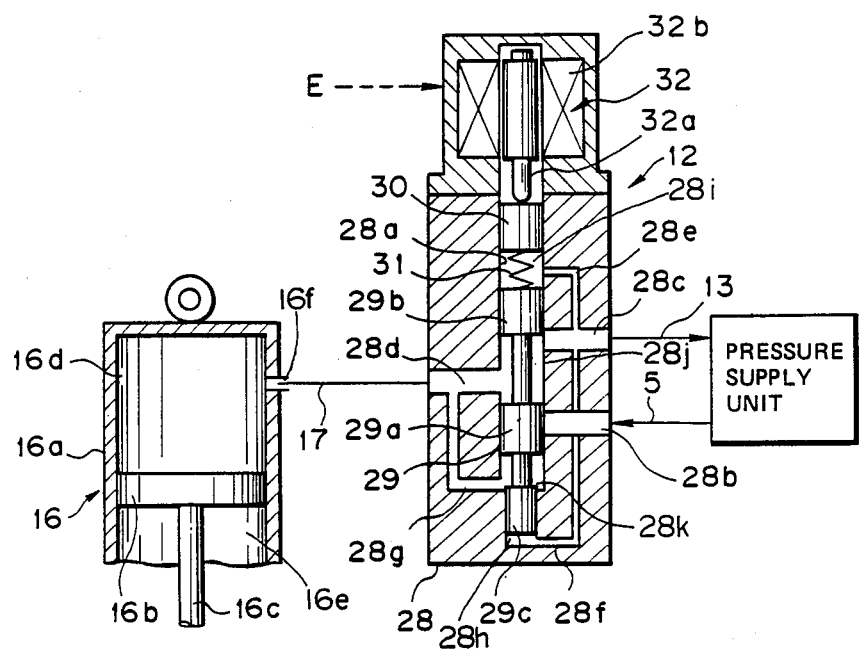
FIGS. 3(a) and 3(b) are sectional view similar to FIG. 2, but showing the condition where a piston in the pressure control valve assembly is shifted upwardly for reducing fluid pressure in a fluid chamber of a hydraulic cylinder in the suspension system and downwardly to increase the fluid pressure in the fluid chamber.

In order to increase the supply pressure of the working fluid, the spool valve 29 is shifted to the position shown in FIG. 3(A) to increase path area at a throttle constituted at the inner end of the inlet port 18b by means of the land 29a of the spool valve 29. On the other hand, in order to decrease the supply pressure of the working fluid, the spool valve is shifted to the position shown in FIG. 3(B) to decrease the path area at the throttle of the inner end of the inlet port 28b and opens the drain port 28b which is normally blocked by means of the land 29b of the spool valve.

Figure 3B:
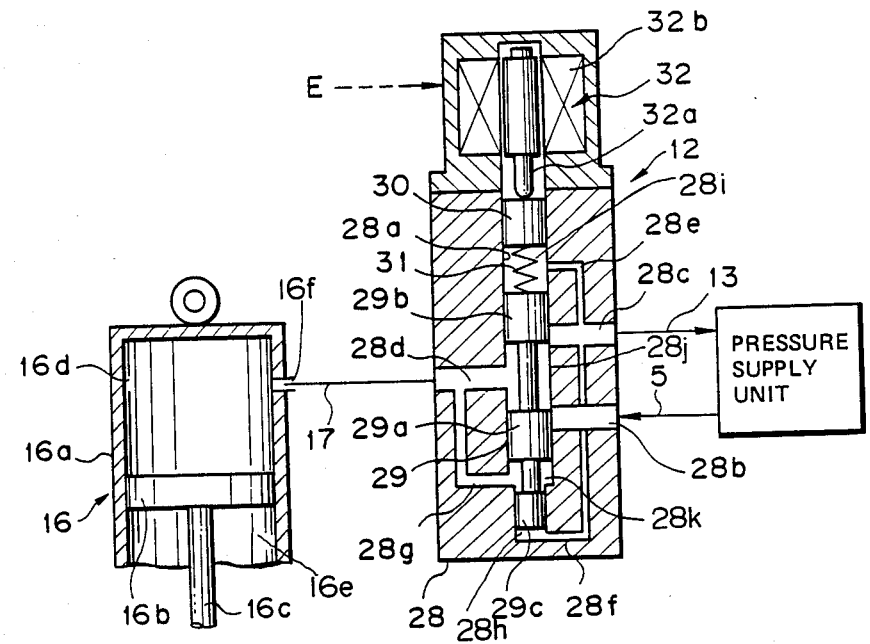

Construction of the pressure control valves should not be specified to the construction as illustrated in FIGS. 2, 3(A) and 3(B) but can be replaced with any appropriate constructions. For Example, the pressure control valve constructions as illustrated in European Patent First Publication No. 01 93 124, set forth above, can also be employed. The disclosure of the aforementioned European Patent First Publication No. 01 93 124 is herein incorporated by reference for the sake of disclosure.

Figure 4:
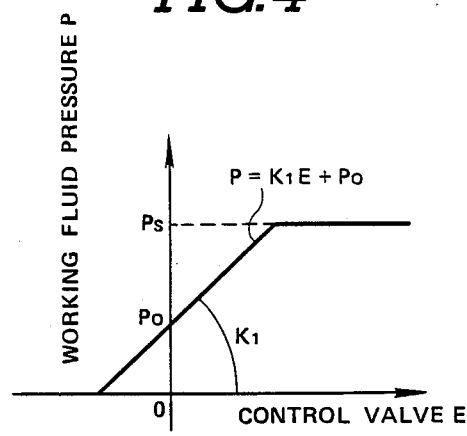
FIG. 4 is a chart showing variation of fluid pressure to be delivered to a hydraulic cylinder according to the valve position of the pressure control valve in the actively controlled automotive suspension system of FIG. 1.

As seen from FIG. 2, the proportioning solenoid 32 comprises the actuator rod 32a and a solenoid coil 32b. The solenoid coil 32b is energized by suspension control signal $V_3$ from the controller 200. In the shown embodiment of the pressure control valve, the working fluid pressure P at the outlet port 28d is variable according to the characteristics shown in FIG. 4. Namely, when the control valve $V_3$ as represented by the suspension control signal is zero, the pressure P at the outlet port 28d becomes $P_0$ determined according to a predetermined offset pressure $P_0$. When the suspension control signal value in positive value increases, the fluid pressure P at the outlet port 28d increases with a predetermined proportioning gain $K_1$. Namely, by increasing of the suspension control value $V_3$, the actuator rod 32a is driven downwardly in FIG. 2 at a magnitude toward to position of FIG. 3(A) to achieve increasing of the fluid pressure with the predetermined proportioning gain $K_1$. The fluid pressure P at the outlet port 28d saturate at the output pressure $P_2$ of the pressure unit 100. On the other hand, when the suspension control signal value $V_3$ decreases, the pressure P decreases to zero to by shifting of the actuator rod 32a toward the direction to FIG. 3(B).

The actuator rod 32a of the proportioning solenoid 32 is associated with the actuator piston 32c. Contact between the actuation rod 32a and the actuator piston 32c can be maintained by the resilient force of the bias spring 32d which normally biases the actuator piston toward the actuation rod. On the other hand, the spring force of the bias spring 32d is also exerted on the valve spool 29 to constantly bias the valve spool downwardly in FIG. 2. The valve spool 29 also receives upward hydraulic force from the pressure control chamber 28k. Therefore, the valve spool 29 is oriented at the position in the valve bore at the position where the downward bias of the bias spring 32d balances with the upward hydraulic force of the pressure control chamber 28k.

When bounding motion occurs at the suspension member, the piston 16c of the hydraulic cylinder 16 shifts upwardly to cause increasing of the fluid pressure in the upper chamber 16d. This causes increasing of the fluid pressure at the outlet port 28d of the pressure control valve 12. As a result, the fluid pressure in the pressure control chamber 28k increases by the pressure introduced through the pilot path 28g to destroy the balance between the downward bias of the bias spring 32d and the upward hydraulic force of the pressure control chamber 28k. This causes upward movement of the valve spool 29 against the spring force of the bias spring 32d, as shown in FIG. 3(B). As a result, path area of the drain port 28c increases and the inlet port 28b becomes being blocked. Therefore, the fluid pressure in the fluid chamber 16d is drained through the drain port. Therefore, the increased fluid pressure in the fluid chamber 16d of the hydraulic cylinder 16 can be successfully absorbed so that the bounding energy input from the suspension member will not be transmitted to the vehicle body.

When rebounding motion occurs at the suspension member, the piston 16c of the hydraulic cylinder 16 shifts downwardly to cause decreasing of the fluid pressure in the upper chamber 16d. This causes decreasing of the fluid pressure at the outlet port 28d of the pressure control valve 12. As a result, the fluid pressure in the pressure control chamber 28k decreases by the pressure introduced through the pilot path 28g to destroy the balance between the downward bias of the bias spring 32d and the upward hydraulic force of the pressure control chamber 28k. This causes downward movement of the valve spool 29 against the spring force of the bias spring 32d, as shown in FIG. 3(A). As a result, path area of the inlet port 28b increases and the drain port 28c becomes being blocked. Therefore, the fluid pressure in the upper fluid chamber 16d is increased by the pressure introduced through the inlet port. Therefore, the decreased fluid pressure in the fluid chamber 16d of the hydraulic cylinder 16 can be successfully absorbed so that the rebounding energy input from the suspension member will not be transmitted to the vehicle body.

Here, since no flow resisting element, such as orifice, throttling valve, is disposed between the fluid reservoir 109 and the drain port 28c, no damping force against the upward motion of the piston 16c in the hydraulic cylinder 16 will be produced in response to the bounding motion of the suspension member. Since the damping force exerted on the piston 16c may serves to allow transmission of the part of bounding energy to the vehicle body to cause rough ride feeling, the shown embodiment of the suspension system may provide satisfactorily high level riding comfort by completely absorbing the bounding and rebounding energy set forth above.

Figure 5:
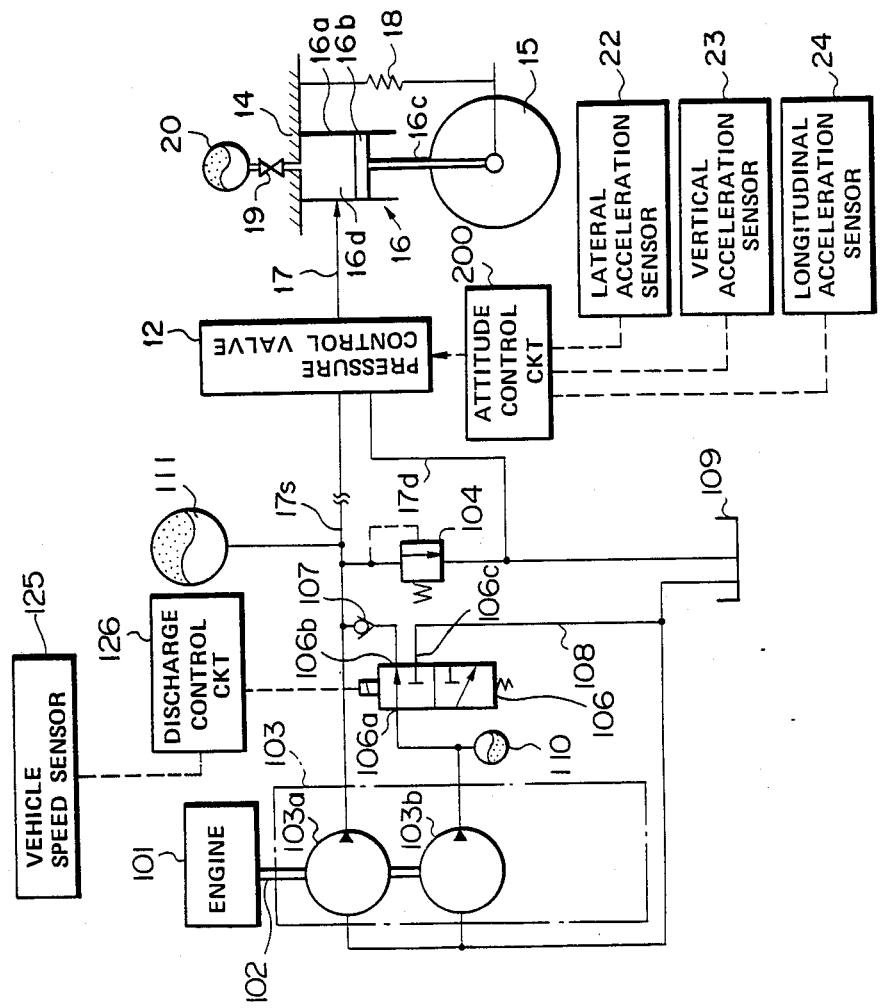
FIG. 5 is a circuit diagram of the first embodiment of a hydraulic circuit of the actively controlled suspension system according to the invention.

The detailed construction of the pressure source unit 100 with the first embodiment of a hydraulic circuit as a hydraulic pressure supply system, will be discussed hereinbelow with reference to FIG. 5. As will be seen from FIG. 5, the pressure unit 103 comprises a fluid pump unit which comprises a primary pump 103a and a secondary pump 103b which is associated with the primary pump in tandem relationship. The discharge rate of the secondary pump 103b is selected substantially greater than that of the primary pump 103a. In addition, the discharge rate of the secondary pump 103b is determined in view of the required maximum working fluid flow rate $Q_{max}$ in the hydraulic circuit. On the other hand, the discharge rate of the primary pump 103a is selected and determined in view of the internal leak amount $Q_0$ of the working fluid in the pressure control valve 12.

Both of the primary and secondary pumps 103a and 103b of the fluid pump unit 103 is mechanically and drivingly connected to an engine output shaft 102 of an automotive internal combustion engine 101 so as to driven by the output torque of the engine. The primary pump 103a has an outlet through which the pressurized working fluid is to be discharged, connected to the pressure control valve 12 via the pressure supply line 17s. On the other hand, the secondary pump 103b is connected to an inlet port 106a of a three ports and two position type electromagnetic flow direction control valve 106. The flow direction control valve 106 has two outlet ports 106b and 106c. The outlet port 106b of the flow direction control valve 106 is connected to the supply line 17s via a one-way check valve 107. The flow direction control valve 106 establishes fluid communication between the inlet port 106a and the outlet port 106a when it is placed at a neutral position. The other outlet port 106c of the flow direction control valve 106 is connected to the fluid reservoir 109 via a drain line 108. The flow direction control valve 106 normally blocks fluid communication between the inlet port 106a and the outlet port 106c so as not to drain the pressurized fluid to the reservoir 109. The flow direction control valve 106 as actuated establishes fluid communication between the inlet port 106a and the outlet port 106c for draining the pressurized fluid therethrough. When actuated, the flow direction control valve 106, of course, blocks fluid communication between the inlet port 106a and the outlet port 106b so as not to supply the pressurized fluid to the pressure supply line 17s.

A pressure accumulator 110 is connected to a pressure line connecting the outlet of the secondary pump 103b and the inlet port 106a of the flow direction control valve 106. This pressure accumulator 110 accumulates fluid pressure to absorb surge pressure from the flow direction control valve 106. By the presence of the pressure accumulator 110, shock to be exerted on the engine 101 via the secondary pump 103b which the valve position is switched between the neutral position and the actuated position, can be successfully absorbed.

A pressure relief circuit with a pressure relief valve 104 is connected to the pressure supply line 17s at a orientation downstream of the junction at which the outlet port 106b of the flow direction control valve 106 is connected to the pressure supply line. The pressure relief valve 104 is set a relief pressure at a pressure corresponding to the rated pressure of the shown hydraulic circuit. Therefore, the working fluid pressure to be introduced to the pressure control valve 12 can be regulated at the rated pressure. As will be seen from FIG. 5, the drain line with the pressure relief valve 104 is connected to the fluid reservoir 109 to return the excessive pressure to the latter. Downstream of the junction at which the drain line including the pressure relieve valve is connected to the pressure supply line 17s, a pressure accumulator 111 is connected for accumulating the fluid pressure therein. This pressure regulator 111 is designed for absorbing pulsation of the working fluid pressure. The pressure accumulator 111 also serves for fluid pressure for pressure control in the hydraulic cylinder 16 at better response characteristics to change of vehicular attitude.

The pressure supply line 17s of the shown hydraulic circuit is connected to the inlet port 28b of the pressure control valve 12. On the other hand, the drain port 28c of the pressure control valve 12 is connected to the fluid reservoir 109 via the drain line 17d.

It should be noted that though the shown embodiment includes a drain line 17d simply connecting the drain port 28c of the pressure control valve 12 to the fluid reservoir, the construction of the drain line 17d may be modified so as to completely shut the drain line 17s at a condition of the hydraulic circuit in which the fluid communication between the pressure control valve 12 and the fluid reservoir 109 is to be blocked. Namely, as will be appreciated and set forth above, since the pressure control valve 12 of the shown embodiment of the actively controlled suspension system, employs a thrusting valve spool type valve, internal leakage of the pressurized fluid is inevitable at the pressure control valve. The leakage of the pressurized working fluid may influence to the attitude control. Especially, when the all of the pressure lines are locked for maintaining the working fluid pressure in the upper fluid chamber 16d of the hydraulic cylinder 16 constant, leakage of the working fluid through the pressure control valve 12 will cause reduction of the fluid pressure in the upper fluid chamber gradually. The modified construction of the drain line 17d has been already been proposed in the co-pending U.S. patent application entitled "Actively Controlled Automotive Suspension System with Line Pressure Control under Low Fluid Source Pressure", Ser. No. 167,835 filed on Mar. 4, 1988. The disclosure of the above-identified co-pending U.S. patent application will be herein incorporated by reference for the sake of disclosure.

In the shown embodiment of FIGS. 1 through 5, the control unit 200 is connected to a lateral acceleration sensor 22 which monitors lateral acceleration to be exerted on the vehicle body and whereby monitors vehicular rolling moment. The lateral acceleration sensor 22 produces a lateral acceleration indicative signal indicative of the monitored lateral acceleration. A vertical acceleration sensor 23 is also connected to the control unit 200 to monitor bounding and rebounding motion of the vehicle to produce a vertical acceleration indicative signal. Furthermore, a longitudinal acceleration sensor 24 is connected to the control unit 200 to monitor longitudinal acceleration to be exerted on the vehicle body, which representative of a magnitude of pitching motion of the vehicle body, to produce a longitudinal acceleration indicative signal. Based on the vehicular attitude change indicative parameters, i.e. lateral acceleration indicative signal value, the vertical acceleration indicative signal value and the longitudinal acceleration indicative signal value, the control unit 200 performs control operation for suppressing vehicular attitude change, i.e. anti-rolling, anti-bouncing and anti-pitching operation.

Practically, the control unit 200 controls the position of the pressure control valve 12 for adjusting the working fluid pressure in the upper fluid chamber 16d of the hydraulic cylinder 16. Anti-rolling, anti-bouncing and anti-pitching suspension control operations to be performed by the control unit 200 have been disclosed in U.S. Pat. No. 4,702,490, issued on Oct. 27, 1987; U.S. patent application Ser. No. 052,934, filed on May 22, 1987; U.S. patent application Ser. No. 059,888, filed on June 9, 1987; U.S. patent application Ser. No. 061,368, filed on June 15, 1987 (European Counterpart has been published as European Patent First Publication No. 02 49 246); U.S. patent application Ser. No. 060,856, filed on June 12, 1987 (European Counterpart has been published as European Patent First Publication No. 02 49 227); U.S. patent application Ser. No. 060,909, filed on June 12, 1987; U.S. patent application Ser. No. 060,911, filed on June 12, 1987; U.S. patent application entitled "Actively Controlled Automotive Suspension System with Acceleration and Angular Velocity Dependent Anti-pitching and/or Anti-rolling Feature" Ser. No. 176,246 filed on March, 1988; U.S. patent application entitled "Actively Controlled Suspension System with Anti-rolling Control", Ser. No. 169,201 filed on Mar. 16, 1988; and U.S. patent application entitled "Actively Controlled Automotive Suspension System with Adjustable Response; Characteristics in Pitching-suppressive Control", Ser. No. 172,419 filed on Mar. 24, 1988

All of the above-referenced U.S. patents and co-pending U.S. patent applications are assigned to the common assignee to the present invention and will be herein incorporated by reference for the sake of disclosure.

In addition, a discharge control circuit 126 is provided for controlling the flow direction control valve 106. The discharge control circuit 126 is connected to a vehicle speed sensor 125 which monitors a vehicular traveling speed to produce a vehicle speed indicative signal. The discharge control circuit 126 includes a comparator for comparing the vehicle speed indicative signal value V with a reference value $V_0$ which representative of substantially low vehicle speed, e.g. 1 km/h. The discharge control circuit 126 outputs LOW level discharge control signal to maintain an actuator 106d of the flow direction control valve 106 deenergized for maintaining fluid communication between the inlet port 106a and the outlet port 106b when the vehicle speed indicative signal value V is greater than the reference value $V_0$. On the other hand, the discharge control circuit 126 outputs HIGH level discharge control signal to the actuator 106d to energize the latter to switch the position of the flow direction control valve 106 to shut fluid communication between the inlet port 106a and the outlet port 106b and establish fluid communication between the inlet port 106a and the outlet port 106c, when the vehicle speed indicative signal V is smaller than or equal to the reference value $V_0$. Therefore, the fluid pressure discharged from the secondary pump 103b is directly returned to the reservoir 109 via the drain line 108.

Figure 6:
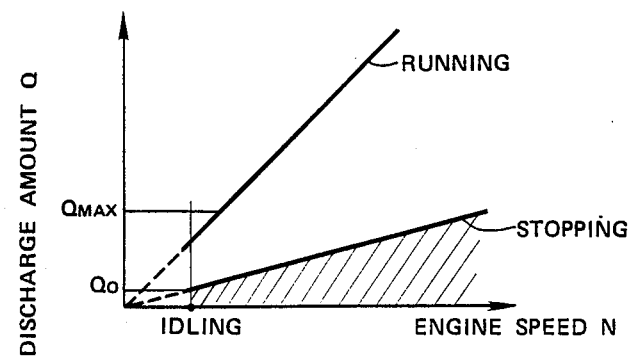
FIG. 6 is a chart showing a working fluid discharge characteristics of a fluid pump employed in the first embodiment of the hydraulic pressure supply system of FIG. 5.

Therefore, as shown in FIG. 6, while the vehicle is stopping, the fluid flow amount through the pressure supply line 17s simply depends on the discharge rate of the primary pump 106a. As shown in FIG. 6, when the engine is in idling state at the minimum engine speed, the discharge rate of the primary pump 103a becomes minimum and substantially corresponds to the amount of the fluid to be drained by internal leakage of the pressure control valve 12. At this time, since the working fluid discharged from the secondary pump 103b is directly returned to the reservoir 109 via the flow direction control valve 106, substantially no load is applied to the secondary pump 103b. As set forth above, since the power consumption for driving pumps 103a and 103b is essentially proportional to the discharge amount of the working fluid from the pumps, the power consumption can be held minimum at the engine idling condition and at the vehicle stopping condition, to drive the pumps 103a and 103b.

The consumed power may be further reduced when the leak amount of the working fluid through the pressure control valve 12 is reduced by the valve arrangement in the drain line 17d disclosed in the co-pending U. S. patent application entitled "Actively Controlled Autometive Suspension System with Line Pressure Control under Low Fluid Source Pressure", Ser. No. 167,835 filed on Mar. 4, 1988, set forth above.

On the other hand, when the vehicle is running, the discharge control circuit 126 operates the flow direction control valve 106 by the HIGH level discharge control signal to establish communication between the secondary pump 103b and the pressure supply line 17s via the flow direction control valve 106. Therefore, the flow amount of the working fluid to be supplied to the pressure supply line 17s becomes sum value of the amounts discharged from the primary and secondary pumps 103a and 103b, as shown in FIG. 6.

Figure 7:
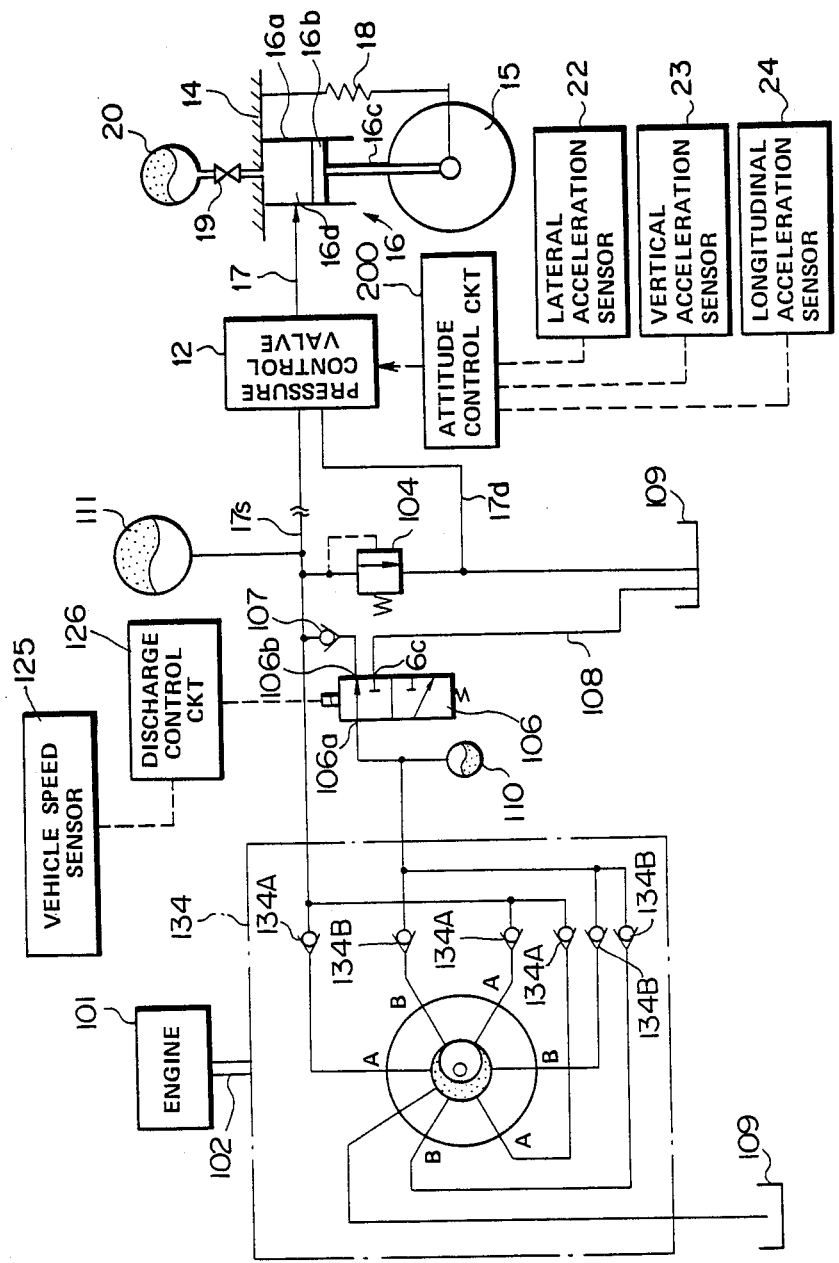
FIG. 7 is a circuit diagram of the second embodiment of a hydraulic circuit of the actively controlled suspension system according to the invention.

FIG. 7 shows the second embodiment of the hydraulic circuit of the present invention. In the following discussion, the constructional components common to the foregoing first embodiment will be represented by the same reference numerals as given in the former embodiment and will not be discussed in detail for avoiding redundant discussion.

As will be seen from FIG. 7, the pressure unit which comprises the primary and second engine-driven pumps 103a and 103b in the former embodiment, is replaced with a plunger type hydraulic pump unit 134. In the shown embodiment, the plunger pump unit 134 comprises a plurality of cylinders, e.g. six cylinders. Each of the cylinders of the plunger pump 134 serves as pump cylinder for discharging pressurized working fluid. The cylinders are grouped into first and second groups as labeled A and B on FIG. 7. As seen, the cylinders alternatively grouped into the first and second groups. The first group of cylinders A are connected to the pressure supply line 17s via one-way check valves 134A. On the other hand, the second group of cylinders B are connected to the inlet port 106a of the flow direction control valve 106 via one-way check valves 134B.

The alternative arrangement of the first and second groups of cylinders will absorb pulsation of the working fluid to be supplied through the pressure supply line 17s.

Figure 8:
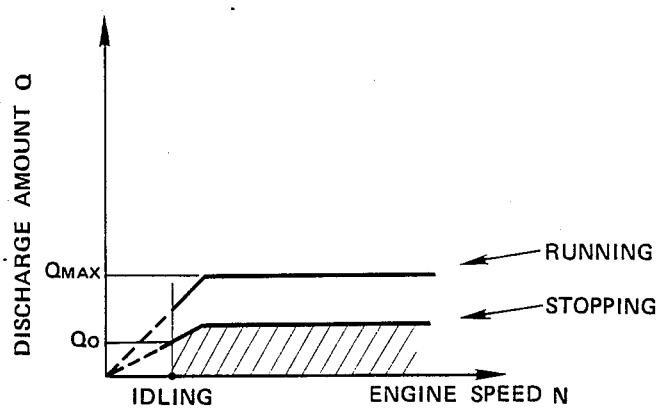
FIG. 8 is a chart showing a working fluid discharge characteristics of a fluid pump employed in the second embodiment of the hydraulic pressure supply system of FIG. 7.

The plunger type fluid pump can be more compact than that the tandem type fluid pumps 103a and 103b employed in the former embodiment. Furthermore, since the plunger pump has discharge characteristics as shown in FIG. 8 to saturate discharge rate at a predetermined rate which is determined by suction efficiency. Therefore, as will be seen from FIG. 8, by selecting the maximum discharge rate of the plunger pump in relation to the rated flow of the hydraulic circuit, the fluid pressure in excess of the relief pressure of the pressure relief valve 104 can be minimized. This minimize power lose of the engine.

Practical pressure control depending upon the vehicle speed by controlling the valve position of the flow direction control valve 106 is substantially identical to that discussed with respect to the former embodiment. Namely, when the vehicle is running, both of the first and second groups of cylinders A and B are connected to the pressure supply line 17s to introduce higher pressure to the pressure control valve 12. On the other hand, when the vehicle is stopping, the fluid pressure generated by the group B cylinders are drained directly through the flow direction control valve 106 and only pressure generated by the group A cylinders will be introduced into the pressure control valve 12.

Figure 9:
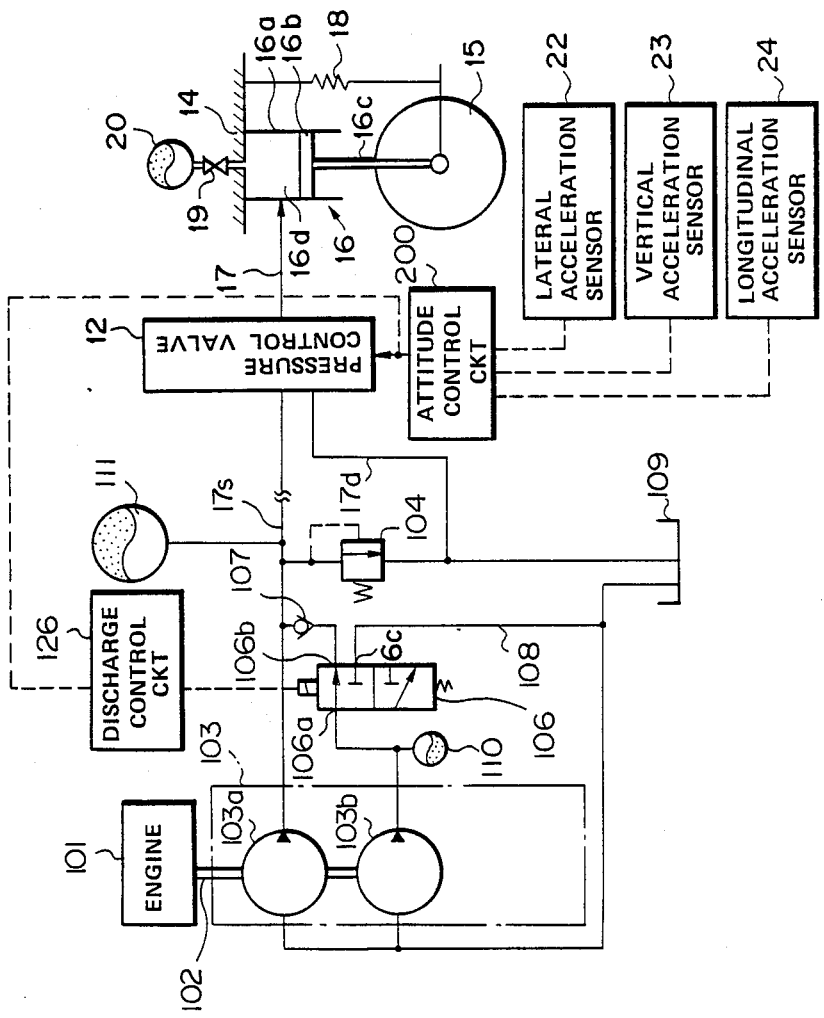
FIG. 9 is a circuit diagram of the third embodiment of a hydraulic circuit of the actively controlled suspension system according to the invention.

FIG. 9 shows the third embodiment of the hydraulic circuit whose hydraulical components are substantially identical to that of the former first embodiment and therefore does not discussed further. In this embodiment, a discharge control circuit 136 is modified from that discussed with respect to the former first and second embodiments. Namely, though the former embodiments employ the discharge control circuit 134 which controls the flow direction control valve 106 based on the vehicle speed, the shown embodiment of the discharge control circuit employs the suspension control signal to be delivered to the pressure control valve 12 as a control parameter for switching the valve position of the flow direction control valve 106. Namely, in the vehicular attitude control to be performed by the control unit 200, greater fluid pressure in the pressure supply line 17s is required only when the working fluid pressure in the upper fluid chamber 16d is to be increased at a rate greater than a predetermined rate. In order to obtain greater fluid pressure increasing rate, the suspension control signal with a greater signal value will be applied to the solenoid 32 for shifting the valve spool 29 at the corresponding position for providing greater path area for introducing the greater amount of working fluid into the upper fluid chamber 16d.

In practice, the flow direction control valve 106 establishes fluid communication between the inlet port 106a and the outlet port 106c when it is placed at a neutral position. The flow direction control valve 106 normally blocks fluid communication between the inlet port 106a and the outlet port 106c so as to drain the pressurized fluid to the reservoir 109. The flow direction control valve 106 as actuated establishes fluid communication between the inlet port 106a and the outlet port 106b for supplying the pressurized fluid to the pressure supply line 17s therethrough.

Figure 10:
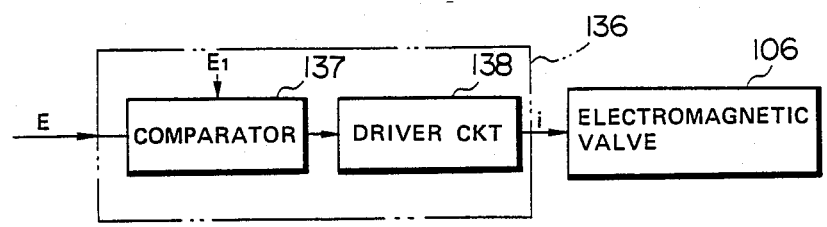
FIG. 10 is a schematic block diagram of a control unit employed in the third embodiment of the actively controlled suspension system of FIG. 9.
Figure 11:
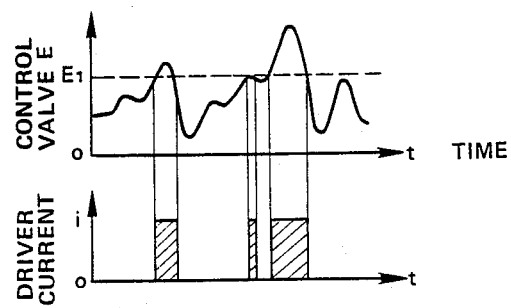
FIG. 11 is a timing chart showing operation of the control unit of FIG. 10.

FIG. 10 shows one of practical construction of the discharge control circuit 136 to be employed in the third embodiment of the hydraulic system according to the invention. As seen from FIG. 10, the discharge control circuit 136 comprises a comparator 137 and a driver circuit 138. The comparator 137 receives the suspension control signal having a signal value E. The comparator 137 is also connected to a reference signal source (not shown) to receive therefrom a reference signal $E_0$ which is representative of a criterion of the suspension control signal indicative of the light and heavy control loads. The comparator 137 compares the suspension control signal value E with the reference signal value $E_0$ to produce a HIGH level comparator signal when the suspension control signal value E is greater than the reference signal value $E_0$ and to produce a LOW level comparator signal when the suspension control signal value E is smaller than or equal to the reference signal value $E_0$. The driver circuit 138 is responsive to the HIGH level comparator signal to output HIGH level driver signal to energize the actuator 106d of the flow direction control value 106 to establish communication between the inlet port 106a and the outlet port 106c, as shown in FIG. 11.

Figure 12:
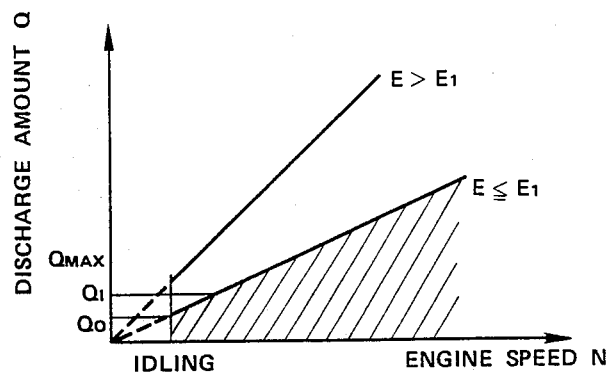
FIG. 12 is a chart showing a working fluid discharge characteristics of the fluid pump to be employed in the third embodiment of the actively controlled suspension system of FIG. 9.

By the operation of the discharge control circuit 136 set forth above, the working fluid flow amount (discharge amount) Q through the pressure supply line 17s varies as shown in FIG. 12. With this construction, since the load on the secondary fluid pump 103b is increased only when the higher pressure supply is required which can be recognized based on the suspension control signal value E, occurrence of loading the secondary fluid pump 103b can be reduced for reduce power consumption.

FIG. 13 is a discharge control circuit 139 which is modified from the discharge control circuit 136 of the third embodiment of FIG. 9. In the shown construction, a monostable multivibrator 140 is inserted between the comparator 137 and the driver circuit 139. The monostable multivibrator 140 is designed to be triggered by the leading edge of the HIGH level comparator signal to output HIGH level signal for a predetermined period of time. This maintains pressure supply to the pressure supply line 17s for the given period set in the monostable multivibrator 140. This supplies sufficient fluid pressure to the pressure accumulator 120 for compensating the consumed fluid. Furthermore, the presence of the monostable multivibrator 140 may reduce occurrence of switching of the flow direction control valve positions for reducing shock to be exerted on the engine which is otherwise caused by changing load to be exerted on the secondary pump 103b. Namely, as shown in FIG. 14, when the suspension control signal value E fluctuates at the value range close to the reference signal value $E_0$, the comparator signal tends to be switched between HIGH and LOW levels frequently to cause frequent change of load on the pump 103b.

FIG. 15 shows another modification of a discharge control circuit 142 to be employed in the third embodiment of the hydraulic circuit of FIG. 9. In this modification, the discharge control circuit 142 includes three comparators 146, 147 and 148. The comparator 146 is connected to the lateral acceleration sensor 22 via a variable amplifier 143. The variable amplifier 143 is disposed between the lateral acceleration sensor 22 and the comparator 146 serves for adjusting response characteristics of discharge control to the lateral acceleration. Similarly, the comparator 147 is connected to the vertical acceleration sensor 23 via a variable amplifier 144. The comparator 148 is also connected to the longitudinal acceleration sensor 24 via a variable amplifier 145. These three comparators 146, 147 and 148 are connected to an OR gate 149 which is, in turn, connected to the driver circuit 138.

The comparator 146 compares the lateral acceleration indicative signal value $E_x$ as amplified by the variable amplifier 144 with a controlled gain, with a lateral acceleration threshold $Ex_{ref}$ which is input from a reference signal generator (not shown). The comparator 146 outputs HIGH level comparator signal when the lateral acceleration indicative signal value $E_x$ is greater than or equal to the lateral acceleration threshold $Ex_{ref}$.

The comparator 147 compares the vertical acceleration indicative signal value $E_z$ as amplified by the variable amplifier 144 with a controlled gain, with a vertical acceleration threshold $Ez_{ref}$ which is input from a reference signal generator (not shown). The comparator 146 outputs HIGH level comparator signal when the vertical acceleration indicative signal value $E_z$ is greater than or equal to the vertical acceleration threshold $Ez_{ref}$.

The comparator 146 compares the longitudinal acceleration indicative signal value $E_y$ as amplified by the variable amplifier 144 with a controlled gain, with a longitudinal acceleration threshold $Ey_{ref}$ which is input from a reference signal generator (not shown). The comparator 146 outputs HIGH level comparator signal when the longitudinal acceleration indicative signal value $E_y$ is greater than or equal to the longitudinal acceleration threshold $Ey_{ref}$.

The OR gate 149 is responsive to HIGH level comparator signal of any one of the comparators 146, 147 and 148 to produce a HIGH level gate signal. The driver circuit 138 is responsive to the HIGH level gate signal of the OR gate 149 to produce the HIGH level driver signal to actuate the actuator 106d of the flow direction control valve 106 to establish communication between the inlet port 106a and the outlet port 106b to supply the pressurized fluid from the secondary pump 103b to the pressure supply line 17s.

Figure 16:
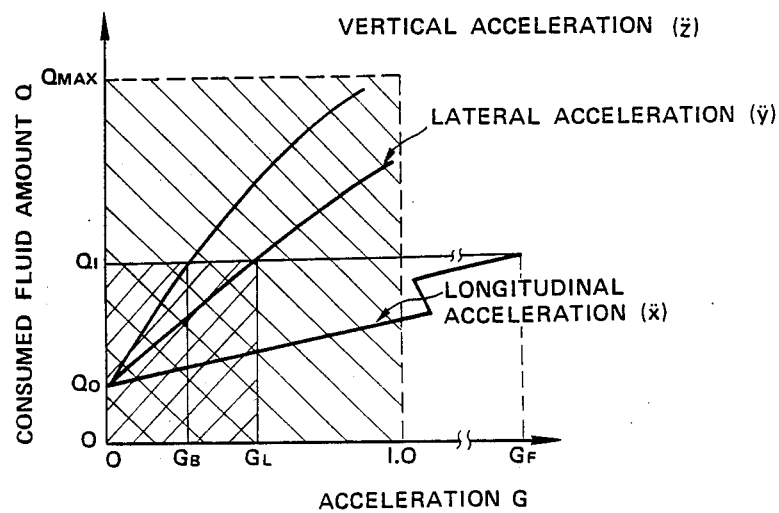
FIG. 16 is a graph showing relationship between accelerations affecting vehicular attitude and amount of working fluid to be consumed.
Figure 18:
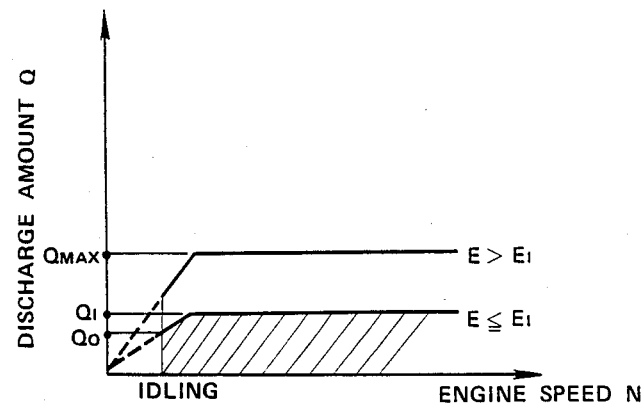
FIG. 18 is a chart showing discharge characteristics of the fluid pump employed in the fourth embodiment of the hydraulic circuit of the actively controlled suspension system.

One example of the pressure supply control in the discharge control valve 106 will be seen from FIG. 16. As seen from FIG. 16, when all of the accelerations indicative signal values $E_x$, $E_z$ and $E_y$ are smaller than respectively corresponding threshold values $Ex_{ref}$, $Ez_{ref}$ and $Ey_{ref}$, the flow direction control valve 106 communicates the inlet port 106a to the outlet port 106c to drain the pressurized fluid from the secondary pump 103b directly to the reservoir 103. Therefore, at this condition, the pressure supplied through the pressure supply line 17s is maintained at the pressure $Q_0$ which essentially corresponds to the internal leak amount of the pressure control valve 12. The fluid pressure in the pressure supply line 17s is variable within a range defined by $Q_0$ and $Q_{max}$ which represents maximum flow rate corresponding to rated flow of the hydraulic circuit. In addition, $Q_1$ value represents maximum fluid pressure to be generated by the primary pump 103a. In FIG. 16, the area shown with singular hutching represents the variation range of fluid consumption amount while the vehicle travels on a rough road and the area shown with double hutching represents the variation range of the fluid consumption amount on the smooth road depending upon the acceleration to be exerted on the vehicle body. Since the shown discharge control circuit 142 controls the flow direction control valve 106 depending upon the fluid consumption amount in attitude control, wasting of the engine power can be successfully prevented.

Figure 17:
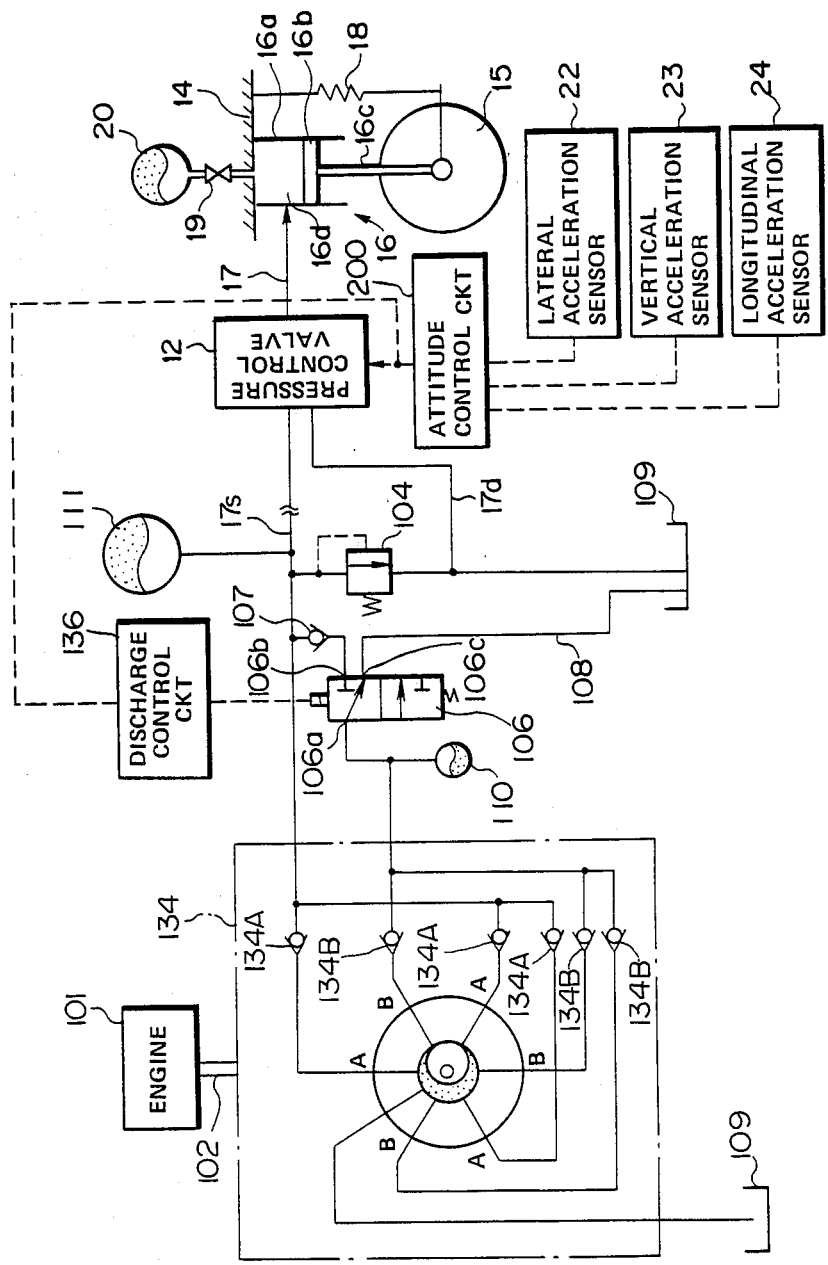
FIG. 17 is a circuit diagram of the fourth embodiment of a hydraulic circuit of the actively controlled suspension system according to the invention.

FIG. 17 shows the fourth embodiment of a hydraulic circuit according to the invention. The hydraulic component of the shown embodiment is substantially identical to that of the second embodiment of FIG. 7 and therefore will not discussed in detail. On the other hand, the discharge control circuit 136 is of the same circuit construction and function as discussed with respect to the third embodiment of FIG. 9. In this embodiment, the fluid communication of the cylinders in group B can be selectively established between the plunger type pump unit 134 and the pressure supply line 17s or the fluid reservoir 109.

Therefore, the fourth embodiment of the hydraulic circuit can exhibit substantially the same effect as discussed with respect to the third embodiment. Furthermore, as discussed with respect to the second embodiment and as shown in FIG. 16, since the discharge rate of the plunger type pump unit 134 is limited by the suction effect, consumption of the engine output power can be saved satisfactorily.

Figure 19:
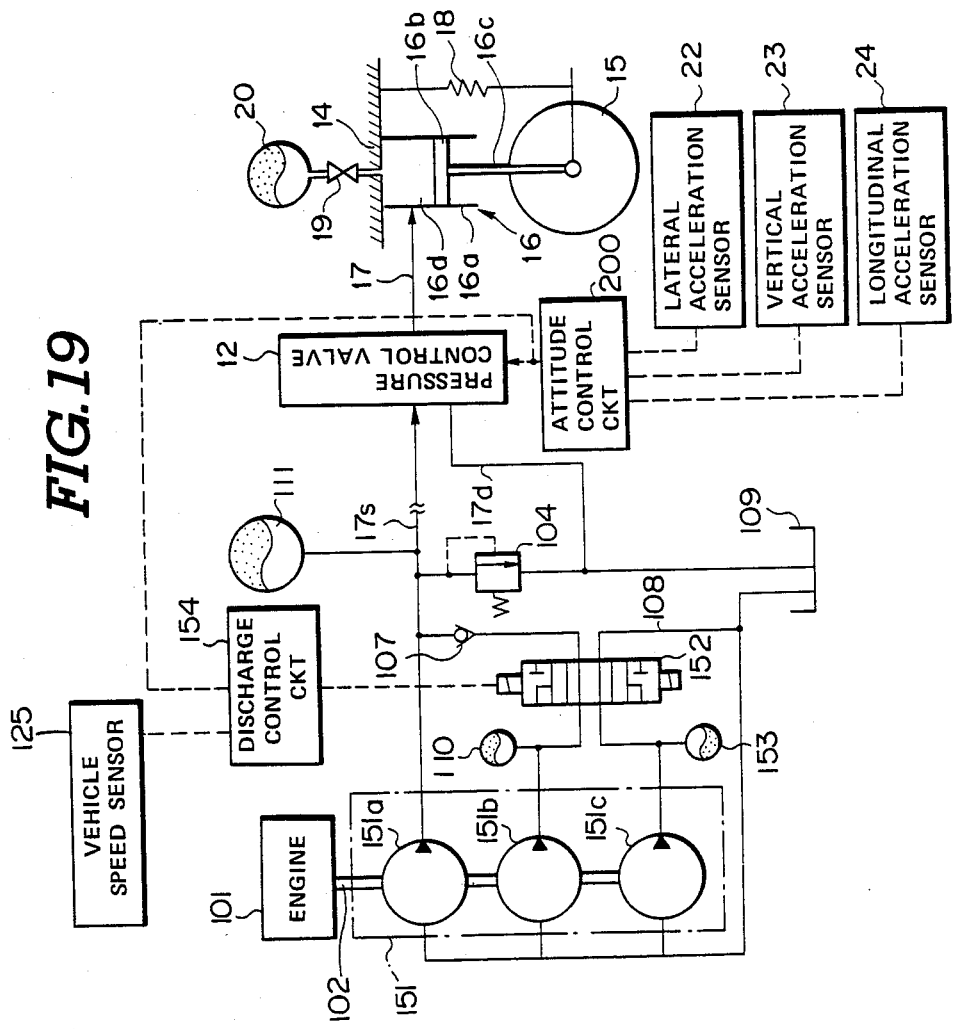
FIG. 19 is a circuit diagram of the fifth embodiment of a hydraulic circuit of the actively controlled suspension system according to the invention.

FIG. 19 shows the fifth embodiment of a hydraulic circuit according to the invention. In this embodiment, three tandem fluid pumps 151a, 151b and 151c are employed in the fluid pump unit 151. These pumps are hereafter referred to as first pump 151a, second pump 151b and third pump 151c. These first, second and third pumps 151a, 151b and 151c are designed and arranged to be driven by the engine output torque. In order to control fluid communication of the pressurized fluid from the second and third pumps 151b and 151c a four ports and three position flow direction control valve 152 is employed. A pressure accumulator 153 is provided in a pressure line between the third pump 151c and the flow direction control valve 152. The flow direction control valve 152 is variable of the valve position between the first position in which both of the second and third pumps 151b and 151c are connected to the reservoir 109 to drain the pressurized fluid from the second and third fluid pumps, the second position in which the second pump 151b is connected to the pressure supply line 17s and the third pump 151c is connected to the reservoir 109, and the third position in which both of the second and third pumps 151b and 151c are connected to the pressure supply line 17s.

A discharge control circuit 154 is connected to an actuator 152a of the flow direction control valve 152 for control valve positions between the aforementioned first, second and third positions. In order to control the valve position, the discharge control circuit 154 is connected to the vehicle speed sensor 125 to receive the vehicle speed indicative signal and to the control unit 200 to receive therefrom the suspension control signal.

Figure 20:
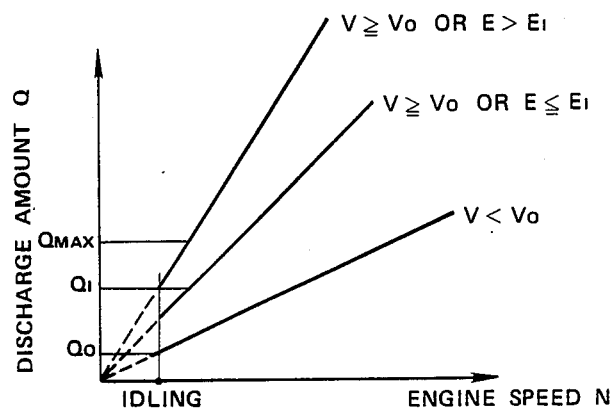
FIG. 20 is a chart showing discharge characteristics of the fluid pump employed in the fifth embodiment of the hydraulic circuit of the actively controlled suspension system.

The discharge control circuit 154 compares the vehicle speed indicative signal value V with the vehicle speed threshold $V_0$ to distinguish the vehicle traveling condition between running and substantially stopping condition. The discharge control circuit 154 also compared the suspension control signal value E with a suspension control threshold $E_0$ to discriminate high suspension control load condition and low suspension control load condition. When the vehicle speed indicative signal value V is smaller than the vehicle speed threshold $V_0$ and the suspension control signal value E is smaller than the suspension control threshold $E_0$, the discharge control circuit 154 generates a first value of a discharge control signal to placing the flow direction control valve 152 at the first position. On the other hand, when the vehicle speed value V is greater than or equal to the vehicle speed threshold $V_0$, and the suspension control signal value E is smaller than the suspension control threshold $E_0$, the discharge control circuit 154 generates a second value of a discharge control signal to placing the flow direction control valve 152 at the second position. When the vehicle speed indicative signal value V is greater than or equal to the vehicle speed threshold $V_0$ and the suspension control signal value E is greater than or equal to the suspension control threshold $E_0$, the discharge control circuit 154 generates a third value of a discharge control signal to placing the flow direction control valve 152 at the third position. Variation of the pressure supply in the pressure supply line 17s is thus variable depending upon the valve positions of the flow direction control valve 152, as shown in FIG. 20.

Figure 21:
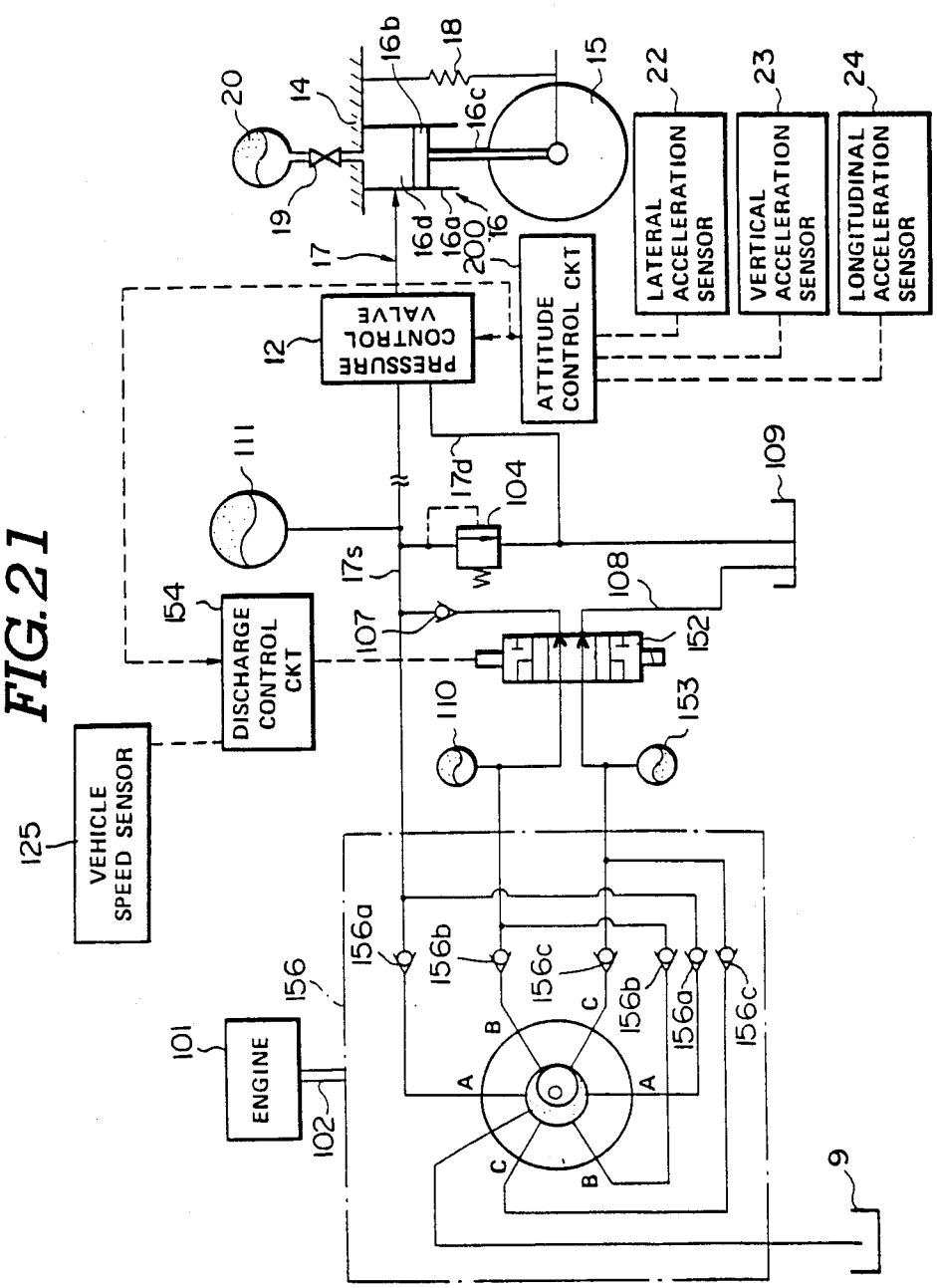
FIG. 21 is a circuit diagram of the sixth embodiment of a hydraulic circuit of the actively controlled suspension system according to the invention.

FIG. 21 show the sixth embodiment of the hydraulic circuit which employs a plunger type pump 156. The pump cylinders are grouped into three groups A, B and C. The pump cylinder of the first group A is connected to the pressure supply line 17s via one-way check valves 156a. The second group of the pump cylinders B are connected to the flow direction control valve 152 via one-way check valves 156b. Further, the third group of the pump cylinders C is connected to the flow direction control valve 152 via one-way check valves 156c.

Figure 22:
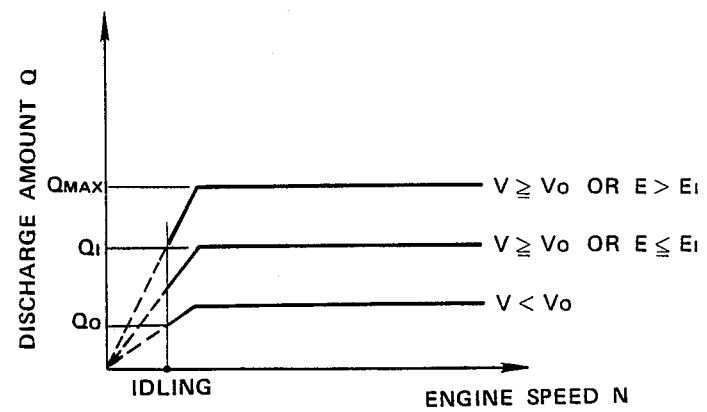
FIG. 22 is a chart showing discharge characteristics of the fluid pump employed in the sixth embodiment of the hydraulic circuit of the actively controlled suspension system.

In the show hydraulic circuit, the pressure supply to the pressure supply line 17s is controlled depending upon the vehicle driving condition and suspension control condition as set out with respect to the fifth embodiment of the invention. Namely, when the vehicle speed indicative signal value V is smaller than the vehicle speed threshold $V_0$ and the suspension control signal value E is smaller than the suspension control threshold $E_0$, the discharge control circuit 154 generates a first value of a discharge control signal to placing the flow direction control valve 152 at the first position for connecting both of the second and third pump cylinders B and C to the fluid reservoir 109. On the other hand, when the vehicle speed value V is greater than or equal to the vehicle speed threshold $V_0$, and the suspension control signal value E is smaller than the suspension control threshold $E_0$, the discharge control circuit 154 generates a second value of a discharge control signal to placing the flow direction control valve 152 at the second position to connect the second group of the pump cylinders B are connected to the pressure supply line 17s and the third group of the pump cylinder C is connected to the fluid reservoir 109. When the vehicle speed indicative signal value V is greater than or equal to the vehicle speed threshold $V_0$ and the suspension control signal value E is greater than or equal to the suspension control threshold $E_0$, the discharge control circuit 154 generates a third value of a discharge control signal to placing the flow direction control valve 152 at the third position to connect the second and third pump cylinders B and C are both connected the pressure supply line 17s. Therefore, variation of the pressure supply in the pressure supply line 17s is thus variable depending upon the valve positions of the flow direction control valve 152, as shown in FIG. 22.

As will be appreciated from the above, the present invention fulfills all of the objects and advantages sought therefor.

What is claimed is:

1. A hydraulic suspension system for an automotive vehicle comprising:
a hydraulic cylinder disposed between a vehicle body and a suspension member rotatably supporting a vehicular wheel, said hydraulic cylinder defining a pressure chamber filled with a working fluid and connected to a hydraulic circuit for varying fluid pressure in said pressure chamber for generating a variable damping force against relative displacement between said vehicle body and said suspension member for regulating the vehicular attitude;
a working fluid pressure source which includes a pressurized fluid source means for generating fluid pressure therein, said pressurized fluid source means being associated with an automotive engine to be driven by the output torque of the engine, which working fluid pressure source is variable of the working fluid discharge rate at least between a first greater rate and a second smaller rate;
a detector means for monitoring a preselected control parameter which representative of the load condition in suspension control for regulating the vehicular attitude to produce a detector signal having a value variable at least between a first value representative of high control load condition and a second value representative of low control load condition; and
control means, associated with said working fluid pressure source and responsive to said detector signal for varying working fluid discharge rate between said first and second rate, said control means operating said working fluid pressure source for supplying pressurized fluid at said first rate in response to said first value of said detector signal.

2. A suspension control system as set forth in claim 1, which further comprises a sensor for monitoring vehicular attitude for producing a sensor signal having a value indicative of magnitude of attitude change of the vehicle body and an attitude controller means which derives a control signal based on said sensor signal for varying fluid pressure in said pressure chamber and whereby regulating the vehicular attitude.

3. A suspension control system as set forth in claim 2, wherein said attitude control means includes a pressure control valve disposed within said hydraulic circuit for controlling supply and drain of working fluid pressure in said pressure chamber, said pressure control valve being variable of the valve position at least between pressure supply position and pressure drain position depending upon a value of control signal derived on the basis of said sensor signal value.

4. A suspension control system as set forth in claim 1, wherein said working fluid source comprises a first and second fluid pumps drivingly connected to aid automotive engine to be driven by the output torque thereof, said first fluid pump being directly connected to a pressure supply line connecting said working fluid source to said hydraulic circuit and said second fluid pump being connected to said hydraulic circuit via a pressure supply control valve serving as said control means for selectively establishing and blocking fluid communication between said second fluid pump and said hydraulic circuit, said pressure supply control valve being responsive to said first value of said detector signal for establishing fluid communication between said second fluid pump and said hydraulic circuit.

5. A suspension control system as set forth in claim 4, wherein said detector means detects vehicle speed lower than a predetermined speed to produce said second value of detector signal and to produce said first value of detector signal otherwise.

6. A suspension control system as set forth in claim 5, wherein said detector means detects the vehicle substantially at stopping condition to produce said second value of detector signal.

7. A suspension control system as set forth in claim 3, wherein said working fluid source comprises a first and second fluid pumps drivingly connected to said automotive engine to be driven by the output torque thereof, said first fluid pump being directly connected to a pressure supply line connecting said working fluid source to said hydraulic circuit and said second fluid pump being connected to said hydraulic circuit via a pressure supply control valve serving as said control means for selectively establishing and blocking fluid communication between said second fluid pump and said hydraulic circuit, said pressure supply control valve being responsive to said first value of said detector signal for establishing fluid communication between said second fluid pump and said hydraulic circuit.

8. A suspension control system as set forth in claim 7, wherein said detector means detects vehicle speed lower than a predetermined speed to produce said second value of detector signal and to produce said first value of detector signal otherwise.

9. A suspension control system as set forth in claim 8, wherein said detector means detects the vehicle substantially at stopping condition to produce said second value of detector signal.

10. A suspension control system as set forth in claim 7, wherein said detector means detects said control signal ordering increase of said fluid pressure in said pressure chamber to produce said first value of detector signal and to produce said second value of detector signal otherwise.

11. A suspension control system as set forth in claim 1, wherein said working fluid pressure source comprises a plunger pump driven by said engine and having at least first and second groups of pump cylinders discharging pressurized working fluid, and said first group of pump cylinders being directly connected to a pressure supply line connecting said working fluid source to said hydraulic circuit and said second group of pump cylinders being connected to said hydraulic circuit via a pressure supply control valve serving as said control means for selectively establishing and blocking fluid communication between said second group of pump cylinders and said hydraulic circuit, said pressure supply control valve being responsive to said first value of said detector signal for establishing fluid communication between said second group of pump cylinders and said hydraulic circuit.

12. A suspension control system as set forth in claim 11, wherein said detector means detects vehicle speed lower than a predetermined speed to produce said second value of detector signal and to produce said first value of detector signal otherwise.

13. A suspension control system as set forth in claim 12, wherein said detector means detects the vehicle substantially at stopping condition to produce said second value of detector signal.

14. A suspension control system as set forth in claim 3, wherein said working fluid pressure source comprises a plunger pump driven by said engine and having at least first and second groups of pump cylinders discharging pressurized working fluid, and said first group of pump cylinders being directly connected to a pressure supply line connecting said working fluid source to said hydraulic circuit and said second group of pump cylinders being connected to said hydraulic circuit via a pressure supply control valve serving as said control means for selectively establishing and blocking fluid communication between said second group of pump cylinders and said hydraulic circuit, said pressure supply control valve being responsive to said first value of said detector signal for establishing fluid communication between said second group of pump cylinders and said hydraulic circuit.

15. A suspension control system as set forth in claim 14, wherein said detector means detects vehicle speed lower than a predetermined speed to produce said second value of detector signal and to produce said first value of detector signal otherwise.

16. A suspension control system as set forth in claim 15, wherein said detector means detects the vehicle substantially at stopping condition to produce said second value of detector signal.

17. A suspension control system as set forth in claim 14, wherein said detector means detects said control signal ordering increase of said fluid pressure in said pressure chamber to produce said first value of detector signal and to produce said second value of detector signal otherwise.

18. An actively controlled automotive suspension system for an automotive vehicle comprising:
a hydraulic cylinder disposed between a vehicle body and a suspension member rotatably supporting a vehicular wheel, said hydraulic cylinder defining a pressure chamber filled with a working fluid and connected to a hydraulic circuit for varying fluid pressure in said pressure chamber for generating a variable damping force against relative displacement between said vehicle body and said suspension member for regulating the vehicular attitude;
a working fluid pressure source which includes a pressurized fluid source means for generating fluid pressure therein, said pressurized fluid source means being associated with an automotive engine to be driven by the output torque of the engine, which working fluid pressure source is variable of the working fluid discharge rate at least between a first greater rate and a second smaller rate;
a sensor for monitoring vehicular attitude for producing a sensor signal having a value indicative of magnitude of attitude change of the vehicle body;
an attitude controller means for deriving a control signal based on said sensor signal for varying fluid pressure in said pressure chamber and whereby regulating the vehicular attitude;

a detector means for monitoring a preselected control parameter which representative of the load condition in suspension control for regulating the vehicular attitude to produce a detector signal having a value variable at least between a first value representative of high control load condition and a second value representative of low control load condition; and control means, associated with said working fluid pressure source and responsive to said detector signal for varying working fluid discharge rate between said first and second rate, said control means operating said working fluid pressure source for supplying pressurized fluid at said first rate in response to said first value of said detector signal.

19. A suspension control system as set forth in claim 18, wherein said attitude control means includes a pressure control valve disposed within said hydraulic circuit for controlling supply and drain of working fluid pressure in said pressure chamber, said pressure control valve being variable of the valve position at least between pressure supply position and pressure drain position depending upon a value of control signal derived on the basis of said sensor signal value.

20. A suspension control system as set forth in claim 18, wherein said working fluid source comprises a first and second fluid pumps drivingly connected to said automotive engine to be driven by the output torque thereof, said first fluid pump being directly connected to a pressure supply line connecting said working fluid source to said hydraulic circuit and said second fluid pump being connected to said hydraulic circuit via a pressure supply control valve serving as said control means for selectively establishing and blocking fluid communication between said second fluid pump and said hydraulic circuit, said pressure supply control valve being responsive to said first value of said detector signal for establishing fluid communication between said second fluid pump and said hydraulic circuit.

21. A suspension control system as set forth in claim 20, wherein said detector means detects vehicle speed lower than a predetermined speed to produce said second value of detector signal and to produce said first value of detector signal otherwise.

22. A suspension control system as set forth in claim 21, wherein said detector means detects the vehicle substantially at stopping condition to produce said second value of detector signal.

23. A suspension control system as set forth in claim 19, wherein said working fluid source comprises a first and second fluid pumps drivingly connected to said automotive engine to be driven by the output torque thereof, said first fluid pump being directly connected to a pressure supply line connecting said working fluid source to said hydraulic circuit and said second fluid pump being connected to said hydraulic circuit via a pressure supply control valve serving as said control means for selectively establishing and blocking fluid communication between said second fluid pump and said hydraulic circuit, said pressure supply control valve being responsive to said first value of said detector signal for establishing fluid communication between said second fluid pump and said hydraulic circuit.

24. A suspension control system as set forth in claim 23, wherein said detector means detects vehicle speed lower than a predetermined speed to produce said second value of detector signal and to produce said first value of detector signal otherwise.

25. A suspension control system as set forth in claim 24, wherein said detector means detects the vehicle substantially at stopping condition to produce said second value of detector signal.

26. A suspension control system as set forth in claim 23, wherein said detector means detects said control signal ordering increase of said fluid pressure in said pressure chamber to produce said first value of detector signal and to produce said second value of detector signal otherwise.

27. A suspension control system as set forth in claim 18, wherein said working fluid pressure source comprises a plunger pump driven by said engine and having at least first and second groups of pump cylinders discharging pressurized working fluid, and said first group of pump cylinders being directly connected to a pressure supply line connecting said working fluid source to said hydraulic circuit and said second group of pump cylinders being connected to said hydraulic circuit via a pressure supply control valve serving as said control means for selectively establishing and blocking fluid communication between said second group of pump cylinders and said hydraulic circuit, said pressure supply control valve being responsive to said first value of said detector signal for establishing fluid communication between said second group of pump cylinders and said hydraulic circuit.

28. A suspension control system as set forth in claim 27, wherein said detector means detects vehicle speed lower than a predetermined speed to produce said second value of detector signal and to produce said first value of detector signal otherwise.

29. A suspension control system as set forth in claim 28, wherein said detector means detects the vehicle substantially at stopping condition to produce said second value of detector signal.

30. A suspension control system as set forth in claim 19, wherein said working fluid pressure source comprises a plunger pump driven by said engine and having at least first and second groups of pump cylinders discharging pressurized working fluid, and said first group of pump cylinders being directly connected to a pressure supply line connecting said working fluid source to said hydraulic circuit and said second group of pump cylinders being connected to said hydraulic circuit via a pressure supply control valve serving as said control means for selectively establishing and blocking fluid communication between said second group of pump cylinders and said hydraulic circuit, said pressure supply control valve being responsive to said first value of said detector signal for establishing fluid communication between said second group of pump cylinders and said hydraulic circuit.

31. A suspension control system as set forth in claim 30, wherein said detector means detects vehicle speed lower than a predetermined speed to produce said second value of detector signal and to produce said first value of detector signal otherwise.

32. A suspension control system as set forth in claim 31, wherein said detector means detects the vehicle substantially at stopping condition to produce said second value of detector signal.

33. A suspension control system as set forth in claim 31, wherein said detector means detects said control signal ordering increase of said fluid pressure in said pressure chamber to produce said first value of detector signal and to produce said second value of detector signal otherwise.

34. A hydraulic pressure supply system for a hydraulically operated vehicular device comprising: suspension system for an automotive vehicle comprising:

a working fluid pressure source which includes a pressurized fluid source means for generating fluid pressure therein, said pressurized fluid source means being associated with an automotive engine to be driven by the output torque of the engine, which working fluid pressure source is variable of the working fluid discharge rate at least between a first greater rate and a second smaller rate;

a detector means for monitoring a preselected control parameter which representative of the load condition in said hydraulically operated vehicular device for producing a detect signal having a value variable at least between a first value representative of high load condition and a second value representative of low load condition; and control means, associated with said working fluid pressure source and responsive to said detector signal for varying working fluid discharge rate between said first and second rate, said control means operating said working fluid pressure source for supplying pressurized fluid at said first rate in response to said first value of said detector signal.

35. A hydraulic pressure supply system for a hydraulically operated vehicular device comprising: suspension system for an automotive vehicle comprising:

a working fluid pressure source which includes a pressurized fluid pump means for generating fluid pressure therein, said pressurized fluid pump means being drivingly associated with an automotive engine to be driven by the output torque of the engine for varying working fluid discharge rate depending upon the engine revolution speed, which working fluid pressure source is further variable of the working fluid supply rate at least between a first greater rate and a second smaller rate;

a detector means for monitoring a preselected control parameter which representative of the load condition in said hydraulically operated vehicular device for producing a detect signal having a value variable at least between a first value representative of high load condition and a second value representative of low load condition; and control means, associated with said working fluid pressure source and responsive to said detector signal for varying working fluid supply rate between said first and second rate, said control means operating said working fluid pressure source for supplying pressurized fluid at said first rate in response to said first value of said detector signal.

* * * * *